US005612888A

United States Patent [19]

Chang et al.

[11] Patent Number: 5,612,888

[45] Date of Patent: Mar. 18, 1997

[54] METHOD AND APPARATUS FOR GENERATING A MAILPIECE

[75] Inventors: Sung S. Chang, Stamford; James L. Harman, Southport; Gary S. Jacobson, East Norwalk; Wesley A. Kirschner; Michael J. Ramadei, both of Trumbull; Eric L. Zuidema, Norwalk, all of Conn.

[73] Assignee: Pitney Bowes Inc., Stamford, Conn.

[21] Appl. No.: 421,120

[22] Filed: Apr. 13, 1995

[51] Int. Cl.[6] .............. G06F 19/00

[52] U.S. Cl. .............. 364/478.09; 364/132; 364/478.14

[58] Field of Search .............. 364/478, 464.02, 364/464.03, 131–134, 138, 478.01, 478.09, 478.12, 478.14, 478.15; 270/58, 58.01, 58.06, 58.09; 395/200.01

[56] References Cited

U.S. PATENT DOCUMENTS

| | | | |
|---|---|---|---|
| 4,547,856 | 10/1985 | Piotroski et al. | 364/478 |
| 4,959,600 | 9/1990 | DiGiulio et al. | 364/478 X |
| 5,003,485 | 3/1991 | Francisco | 364/478 |
| 5,177,687 | 1/1993 | Baggarly et al. | 364/478 X |
| 5,331,538 | 7/1994 | DiGiulio et al. | 364/134 |
| 5,448,490 | 9/1995 | Gottlieb et al. | 364/478 |

*Primary Examiner*—Joseph Ruggiero
*Attorney, Agent, or Firm*—Ronald Reichman; Brigitte L. Jeffery; Melvin J. Scolnick

[57] ABSTRACT

A table will be generated for tracking each mailpiece in a mailing system having multiple document paths. Attribute data relating to a mailpiece will be stored in a memory while job data relating to a mailing job will also be stored in a memory. A sequence builder process will look at the attribute data and determine the motion profiles that are required to ensure the mailpiece obtains the desired attributes. The sequence builder then commands execution of the motion profiles.

20 Claims, 7 Drawing Sheets

METHOD AND APPARATUS FOR GENERATING A MAILPIECE

BACKGROUND OF THE INVENTION

The subject invention relates to a method for generating a mailpiece. More particularly, it relates to a host computer particularly suited for control of a mailing system.

Mailing machines are utilized for printing, collating and inserting various documents into an envelope. Typically, feeders deposit documents onto a moving conveyor belt, and the various documents are collected, aligned and inserted into an envelope. Conventionally, the printing means, feeding means, collecting means, aligning means, and inserting means are situated along a single document path. The marketplace today requires that mailpieces should be generated as rapidly as possible, and it should be apparent that the use of a single document path is a time consuming process.

Many methods for control of a mailing system with a single document path have been developed. While these methods can work quite well, these solutions have certain inadequacies which limit the use of known control methods with a mailing system having multiple document paths. For example, it is difficult to track the number of active mailpieces in the mailing system. In particular, it is an arduous task to keep global track of the mailpiece contents. Still further, it is burdensome to generate a mailpiece in a high speed mailing system without providing an address document coded with the mailpiece contents. None of the heretofore known methods for control of a mailing system teach a method for generating a mailpiece in a manner to globally track mailpieces along multiple document paths thereby increasing mailpiece integrity.

DEFINITION

As used herein, the following terms have the meaning set forth.

Segment: A data element including identification of the motor, solenoid, or sensor effected by the segment command (if any); a command to be executed by the motion control processor during the segment, and any information required for execution of the segment command.

Profile: A sequence of segments whose execution by a motion control processor controls a mechanical system to carry out a corresponding mechanical function.

Mailpiece attribute: a data element defining a physical characteristic of a mailpiece generated by a mechanical system. P Job attribute: a data element defining instructions for system wide handling of all pieces in a job run.

SUMMARY OF THE INVENTION

It is an object of the invention to provide an improved method for generating a mailpiece in a high speed mailing system without printing codes on each mailpiece.

It is still further an object of the invention to provide a method for generating a mailpiece in a mailing system having multiple document paths.

It is still further an object of the invention to provide a method for logically tracking mailpiece production as the physical mailpiece moves from mechanical module to mechanical module.

It is a further object of the invention to provide a software architecture such that the base control software for determining the motion control requirements for each mailpiece will be the same for each mechanical module.

These and other objects and advantages as will appear hereinafter are attained in a novel method for generating a mailpiece in a mailing system having multiple document paths. A table will be generated for tracking each mailpiece in the mailing system. Attribute data relating to a mailpiece will be stored in a memory while job data relating to a mailing job will also be stored in the memory. A sequence builder process will look at the attribute data and determine the motion profiles that are required to ensure the mailpiece obtains the desired attributes. The sequence builder then commands execution of the motion profiles.

DESCRIPTION OF THE PREFERRED EMBODIMENT

Figure 1:
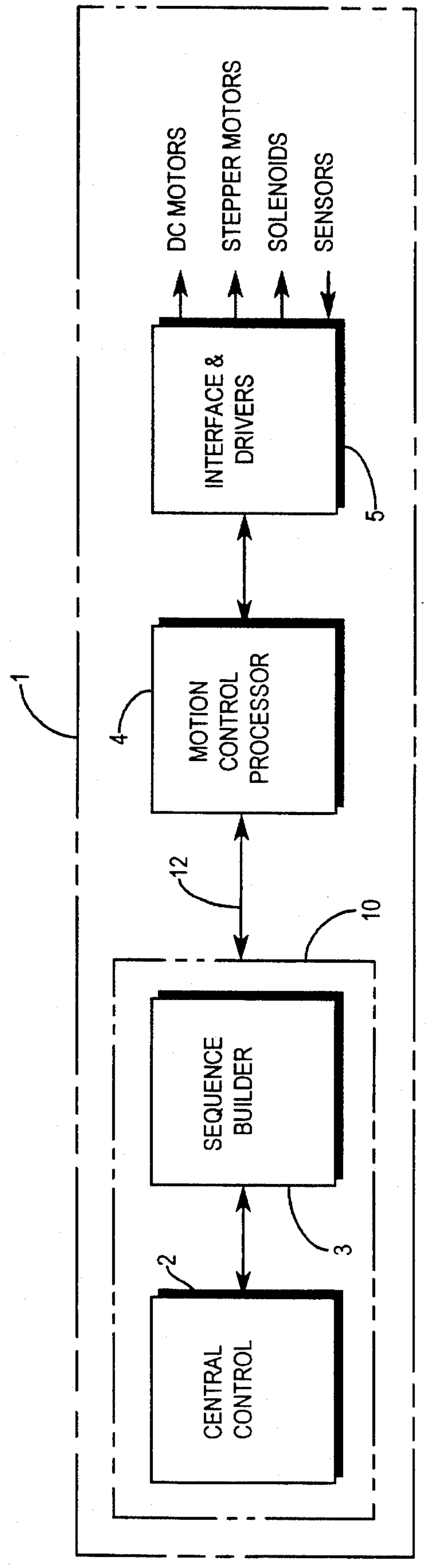
FIG. 1 is a schematic block diagram of an apparatus for generating a mailpiece in accordance with the subject invention.

Referring to FIG. 1, there is shown a mailing system 1 on which the present invention may be employed. The mailing system 1 includes a host processor 10 which is provided with a multitasking operating system program. Mailing system 1 has a central control process 2 and a sequence builder process 3 running on the host processor 10. A motion control processor 4 is connected to host processor 10 through communications link 12 for transmission of messages between host processor 10 and motion control processor 4. Communications link 12 may be any suitable communications link having the necessary communications capacity for the subject invention. Host processor 10 is preferably an Intel 80386 processor and will determine the motion control requirements to be communicated to motion control processor 4. A preferred embodiment of the motion control processor 4 is described in commonly assigned, co-pending U.S. application Ser. No. 08/327,246 filed Oct. 24, 1994, which is hereby incorporated by reference.

Interface and drivers 5 comprises circuitry which converts the digital output of motion control processor 4 into control signals having the proper waveform and timing to control a mailing system. Details of the design of interface and drivers 5 will of course depend upon the processor selected as motion control processor 4. Such design would be a matter of routine for a person of ordinary skill in the art and need not be discussed further herein for an understanding of the subject invention. Generally, in the subject invention, interface and drivers 5 will output control signals to DC motors, stepper motors, and solenoids and receive status signals from sensors in the mailing system.

Figure 2:
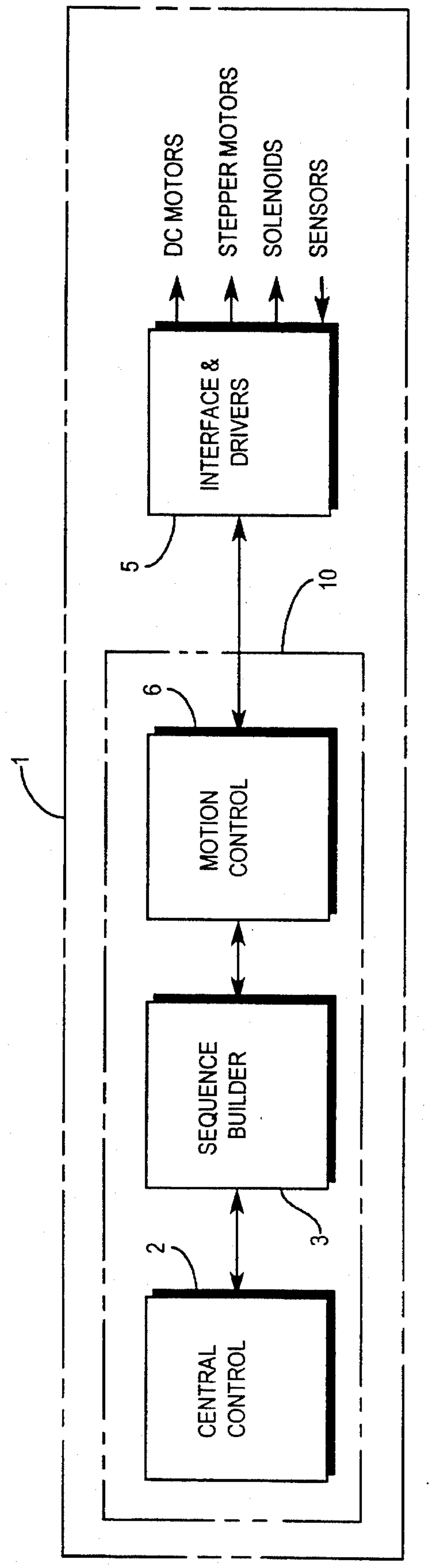
FIG. 2 is a schematic block diagram of an alternate embodiment of the apparatus for generating a mailpiece in accordance with the subject invention.

FIG. 2 shows an alternative embodiment of a mailing system 1 in accordance with the subject invention. In this configuration, the motion control requirements are handled by a motion control process 6 which resides in host processor 10. This flexible architecture enables the host processor 10 to implement the subject invention in a single processor environment yet maintain mailpiece integrity without the need for a dedicated motion control processor.

Figure 3:
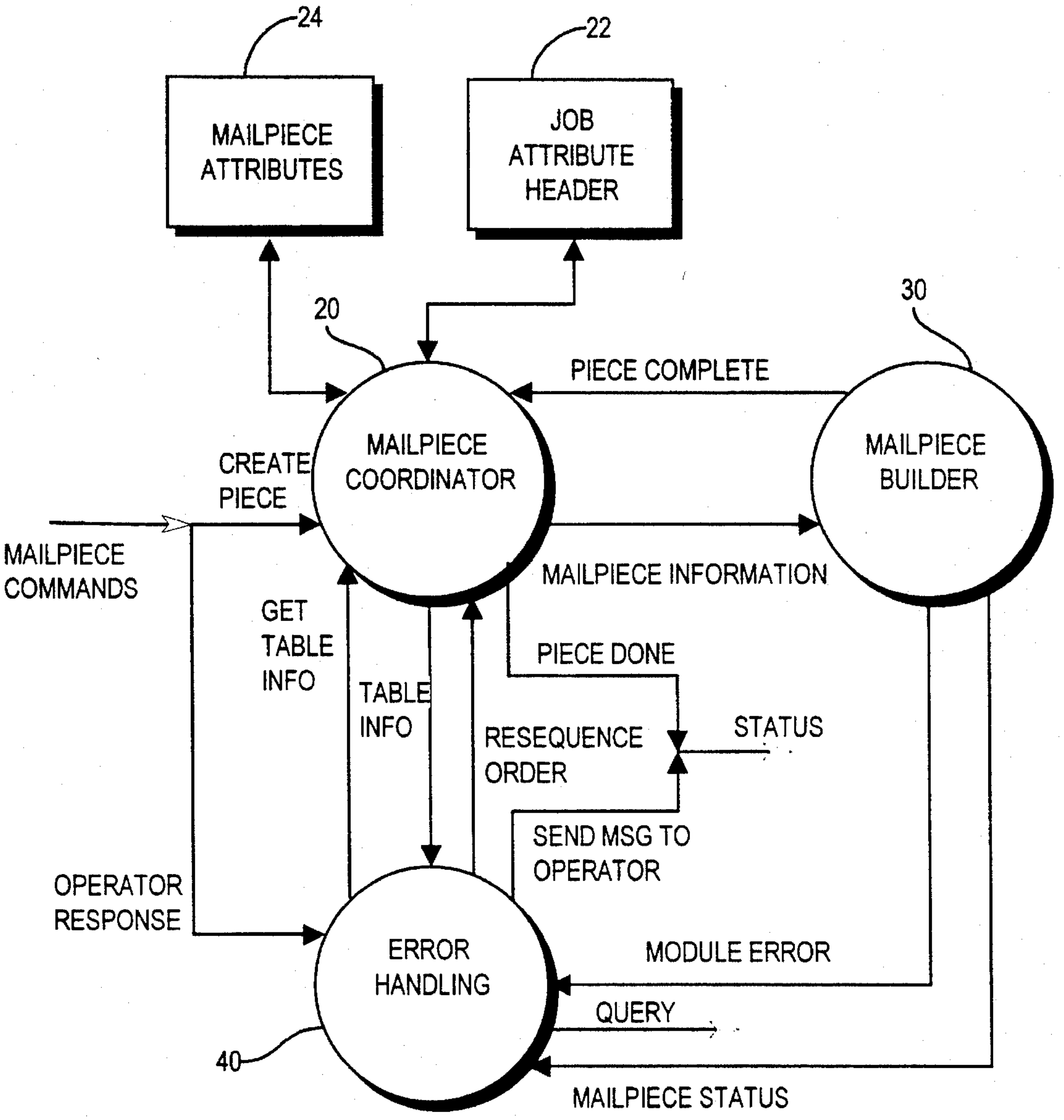
FIG. 3 is a representation of relationships between tasks performed by the host computer used in the apparatus of FIG. 1.

FIG. 3 shows the software architecture for host processor 10. Central control process 2 includes the mailpiece coordinator task 20 which tracks the processing order of a mailpiece in the mailing system and error handling task 40 which maintains mailpiece integrity in the event the mailing system experiences a fault. The sequence builder process 3 includes at least one mailpiece builder task 30 which determines motion control requirements for each mailpiece.

The mailpiece coordinator task 20 generates a table 24 for each mailpiece in the mailing system. The table 24 includes the mailpiece attributes which are required for the mailpiece. Mailpiece attributes used in a preferred embodiment of the subject invention are set forth in Table 1.

TABLE I

| MAILPIECE ATTRIBUTE | COMMENT |
|---|---|
| Printer Tokens | Identifies specific document pages. |
| Mailpiece Number | The tracking number for the mailpiece. |
| Total Pages | Number of pages in a document. |
| Document Destination | Output destination for a printed document. |
| Fold Type | C or Z fold. |
| Pre-Print Feeder Number | Feeder to use for the pre-printed sheets. |
| BRE Feeder Number | Feeders to use for feeding reply envelopes |
| Seal Piece | Determines whether or not to seal a mailpiece. |
| Dry Time | The dry time to use for the mailpiece. |
| Envelope Printing | TRUE if envelope is being printed on. FALSE if the envelope is fed without printing. |
| Print Postage | Indicates whether an indicia is needed for the mailpiece. If so, the postage value is indicated. |
| Stack Location | Destination of complete mailpiece. |
| Stack Offset | TRUE if offsetting piece in stacker. Otherwise, FALSE. |

In addition to the table 24, the mailpiece coordinator task 20 stores a job attribute header 22 for information that applies to all mailpieces in the job run. The job attributes 22 would define the regeneration algorithm in the event of a mechanical fault, order of output documents, and maximum number of mailpieces allowed in the system. The number of pieces to place in the mail output bin may be specified on a per job basis using the job attributes 22 or on a per mailpiece basis using the mailpiece attributes.

Referring to FIG. 3, when the mailpiece coordinator task 20 receives a CREATE PIECE command, the mailpiece coordinator task 20 determines whether the created mailpiece will be the first mailpiece in a job run. If it is the first mailpiece, the mailpiece coordinator task 20 will update the mailpiece table 24 with mailpiece attributes and will also update the job attributes data store 22; both data elements accompany the CREATE PIECE command. If it is not the first mailpiece, the mailpiece coordinator task 20 will only update the mailpiece table 24. Next, the mailpiece coordinator task 20 transmits the mailpiece information for the received mailpiece to the mailpiece builder task 30 which determines the motion control requirements for each mailpiece. In a mailing system with a plurality of mechanical modules, the host computer 10 runs at least one mailpiece builder task 30 for each mechanical module. Each of the mailpiece builder tasks 30 that represent a mechanical module in the mailing system will execute the same software. The mailpiece attributes 24 received and acted upon by each mailpiece builder task 30 will differ for each mechanical module. Therefore, while the same software can drive each mailpiece builder task 30, the data associated with the plurality of tasks will differ. In this manner, the software architecture allows the host computer 10 to logically track a mailpiece through the mechanical modules of the mailing system.

Figure 4A:
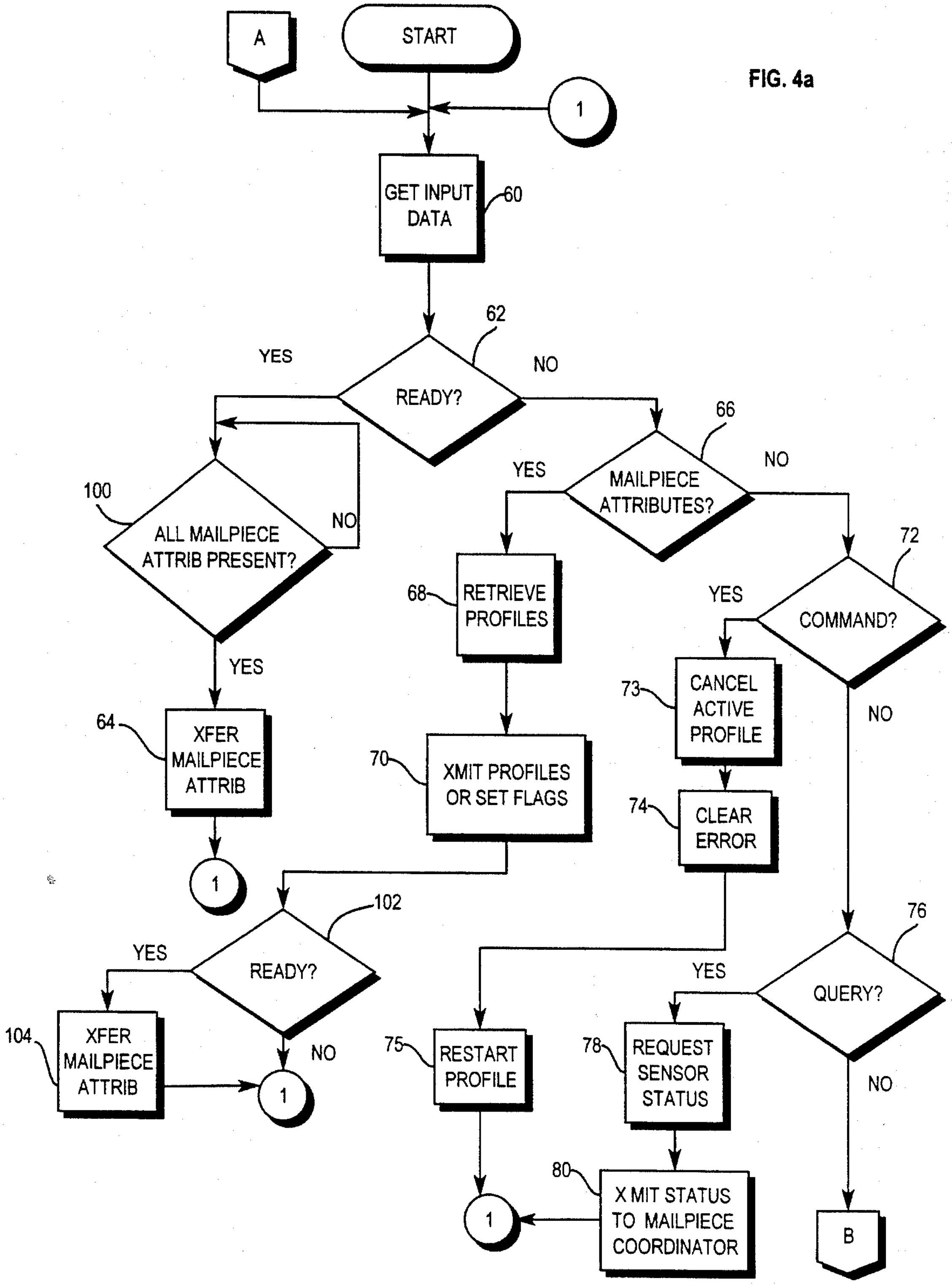
FIGS. 4*a*, 4*b*, and 4*c* show a flow diagram for the mailpiece builder task shown in FIG. 3.
Figure 4B:
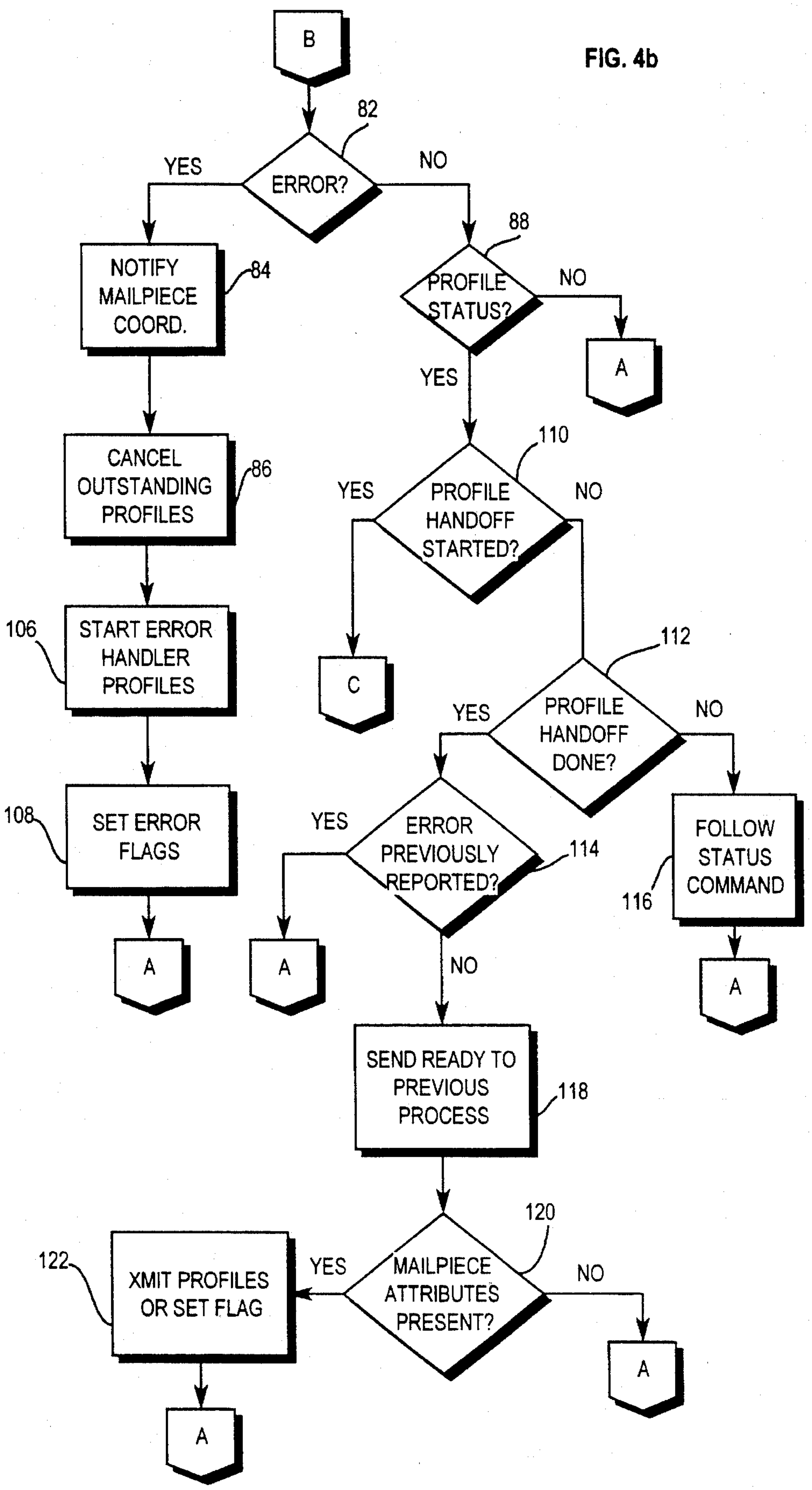
Figure 4C:
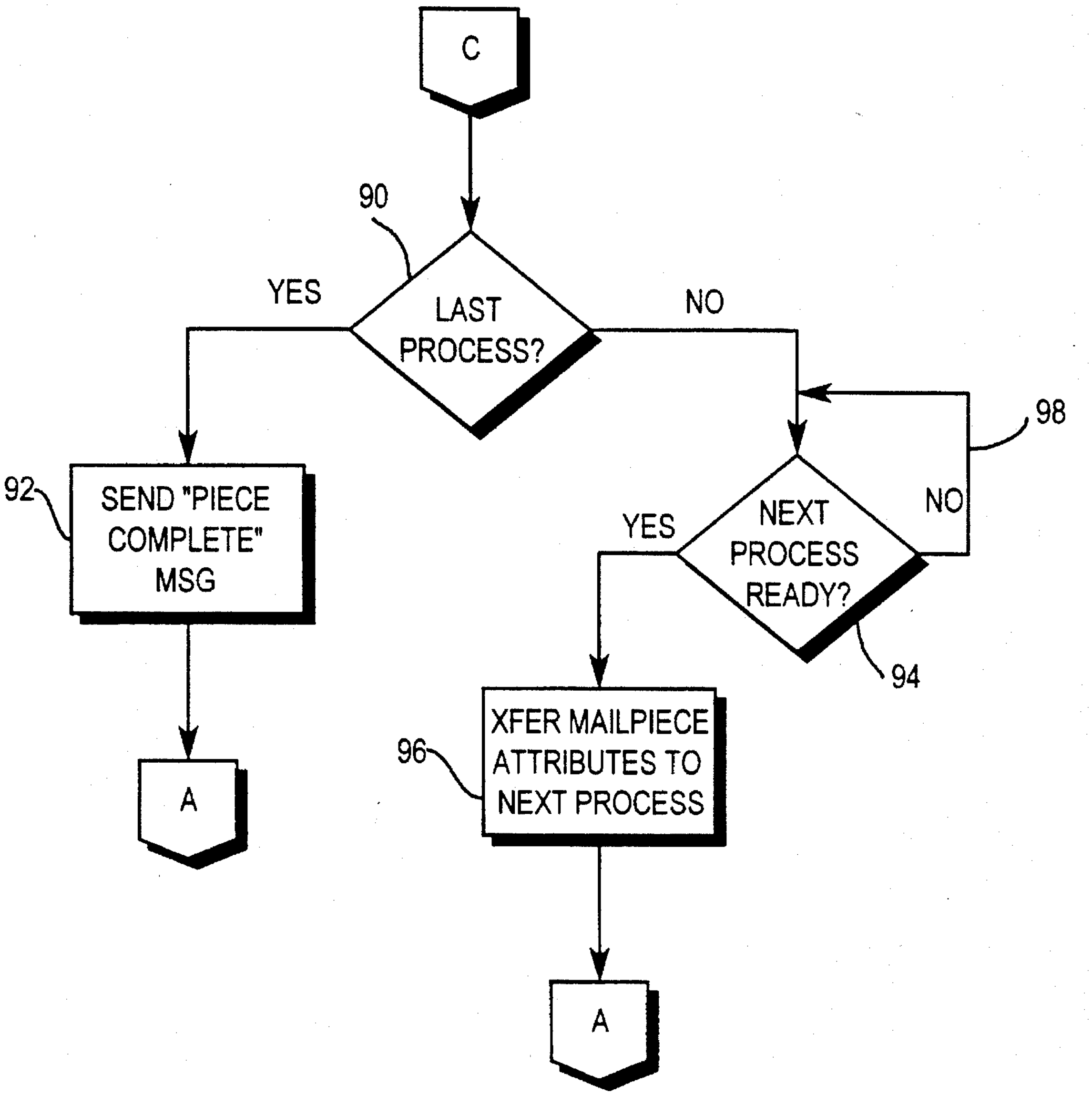
Figure 5:
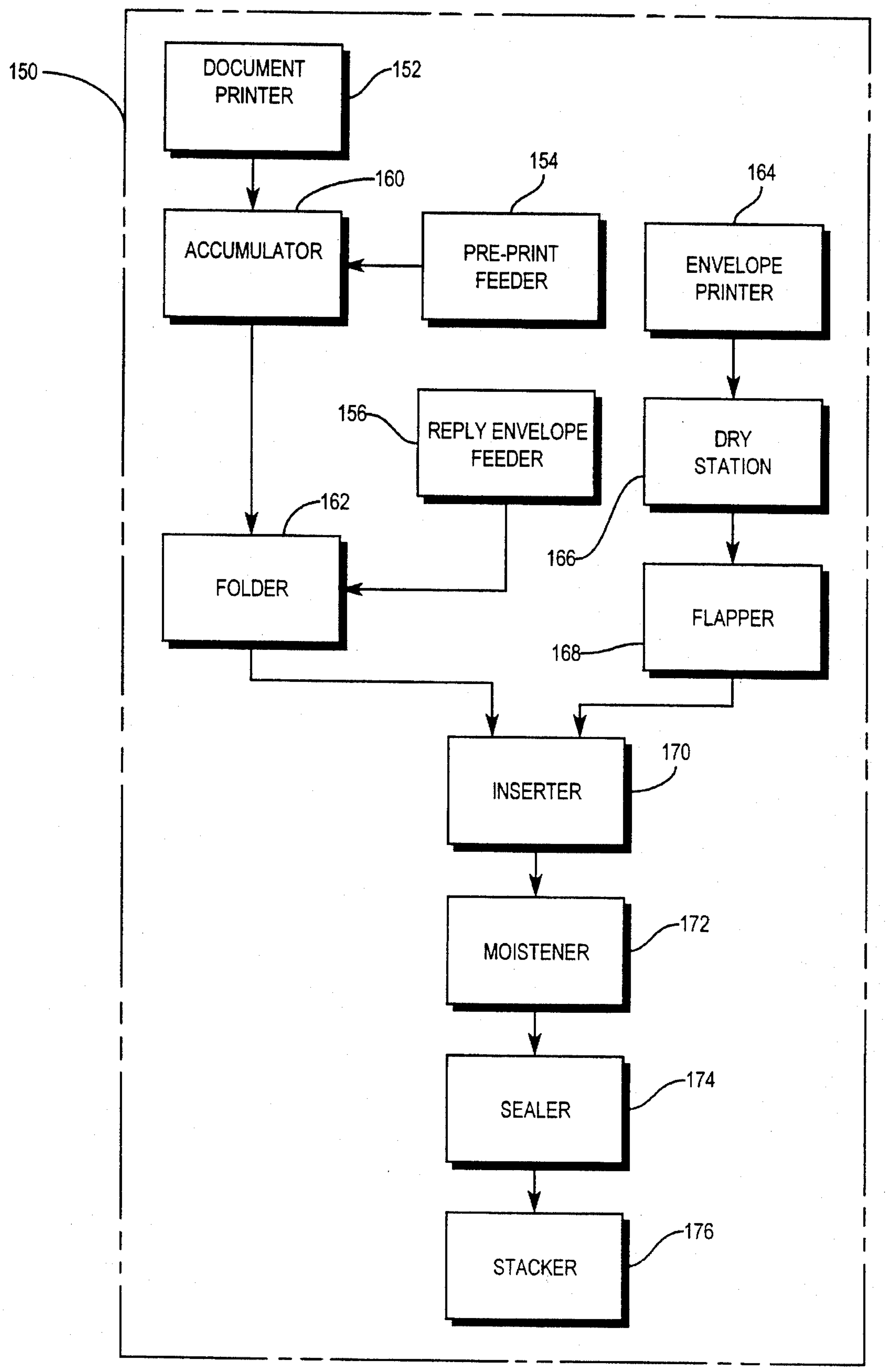
FIG. 5 is a schematic block diagram of a mailing system having multiple document paths.

FIGS. 4*a*, 4*b*, and 4*c* show a flow diagram of the operation of mailpiece builder task 30. At step 60, in response to mailpiece information being transferred from the mailpiece coordinator task 20, the mailpiece builder task 30 retrieves the mailpiece information received from the mailpiece coordinator 20. Decision block 62 determines whether the mailpiece information includes a READY signal from the next logical mailpiece builder task representing a subsequent mechanical module. If the mailpiece builder task receives a READY signal, decision block 100 determines whether all mailpiece attributes are present before proceeding to the next step. At step 64, mailpiece attributes will be passed to the next logical mailpiece builder task. In the subject invention, if a subsequent mechanical module does not report a problem to its corresponding mailpiece builder task, and the subsequent mechanical module is notified by the profile that the piece has been passed on, its corresponding mailpiece builder task will indicate to the mailpiece builder task for a preceding mechanical module that the subsequent mechanical module is ready to receive data.

Decision block 66 determines whether the mailpiece information consists of mailpiece attributes 24 from the preceding mailpiece builder task. If so, the mailpiece builder task at step 68 retrieves the motor, sensor, and solenoid profiles which correspond to the mailpiece attributes 24. At step 70, the mailpiece builder task 30 will set flags in the profiles to the motion control processor 4. Typically, all profiles will be downloaded on power up or when motion control processor 4 is otherwise initialized. However, it is within the contemplation of the subject invention that profiles can be downloaded during operation of the mailing system to change the operating parameters of the system. Decision block 102 determines whether the motion control processor 4 is ready to receive mailpiece attributes data. If so, the mailpiece builder task 30 at step 104 transfers the mailpiece attributes to the motion control processor 4.

Decision block 72 determines whether the mailpiece information consists of a mechanical module command. The mailpiece coordinator 20 uses the mechanical module command to inform the module that a downstream error has occurred. At step 73, the mailpiece builder brings mailpieces in the mechanical module to rest and cancels any outstanding profiles. After the downstream error is cleared at step 74, the mailpiece coordinator sends a mechanical module command to restart the profiles at step 75, which were previously canceled.

Decision block 76 determines whether the mailpiece information consists of a query command requesting the mailpiece builder 30 to query the motion control processor 4 to determine if a mailpiece or mailpieces are present in the mechanical module. At step 78, the mailpiece builder requests sensor status from the motion control processor 4. Upon receiving the sensor data, the mailpiece builder 30 determines if paper is present, and at step 80 transfers the sensor status to the mailpiece coordinator 20.

Referring to FIG. 4*b*, decision block 82 determines whether the mailpiece information consists of an error message from a preceding mechanical module. In the subject invention, errors propagate through the mailpiece system either through an error message from a profile or a notification from the mailpiece coordinator 20 commanding the mailpiece builder 30 to bring mailpieces in the mechanical module to a stop and cancel profiles. If the mailpiece builder 30 receives an error message, at step 84, the mailpiece builder 30 will notify the mailpiece coordinator 20 of an error, then, at step 86, command the motion control processor 4 to cancel outstanding profiles. Next, at step 106, the mailpiece builder 30 will start error handler profiles and, at step 108, set error flags in the motion controller 4.

Decision block 88 determines whether the mailpiece information contains a profile complete status from the motion control processor 4. If the profile complete status is received from the motion control processor 4, decision block 110 determines whether the physical mailpiece has started to move into the next mechanical module. If at step 112 the profile hand-off is complete for the mechanical module which will receive the mailpiece, and if at step 114 there are no previously reported errors, the mailpiece builder task 30 sends a READY signal to mailpiece builder task for the preceding mechanical module at step 118. If the mailpiece attributes are present at step 120, the mailpiece builder task transmits commands to select and initiate the appropriate profiles to the motion control processor at step 122.

Referring to FIG. 4*c*, if the profile hand-off has started, decision block 90 determines whether the mailpiece builder task 30 represents the last logical mailpiece builder task required to complete the mailpiece. If the mailpiece is complete, at 92, the mailpiece builder task transmits a piece complete message to the mailpiece coordinator 20. If the mailpiece is incomplete, decision block 94 determines whether the next logical mailpiece builder task is ready to receive the mailpiece. If the next mailpiece builder task is busy, the mailpiece builder task at 98 waits until the software task is ready. At 96, the mailpiece builder transfers mailpiece attributes to the next logical mailpiece builder task.

To assist those skilled in the art in understanding how the subject invention generates a mailpiece, there is shown a multiple document path mailing system 150 on which the present invention may be employed. System 150 includes the following mechanical modules: document printer 152, pre-print feeder 154, reply envelope feeder 156, accumulator 160, folder 162, envelope printer 164, dry station 166, flapper 168, inserter 170, moistener 172, sealer 174, and stacker 176. Set forth below, by way of example only, is pseudocode such as could be used to implement the method of the present invention in system 150.

```
FOR Mailpiece Coordinator Task
    IF CREATE PIECE Received by Mailpiece Coordinator
        Write mailpiece attributes into a table;
        Pass Document Attributes to tasks for mechanical
        modules at the beginning of each document path;
        FOR first document path
            Pass Document Attributes to the Document
            Printer mailbuilder task;
        FOR second document path
            Pass Preprint Attributes to the Preprint
            mailbuilder task;
        FOR third document path
            Pass Reply Envelope Feeder Attributes to
```

-continued

```
the
            Reply Envelope Feeder mailbuilder task;
        FOR fourth document path
            Pass Envelope Attributes to the Envelope
            Printer mailbuilder task;
    Monitor output from mailbuilder tasks;
    END IF.
    IF PIECE COMPLETE message received from the
        Stacker
        Delete mailpiece attributes from table;
    END IF.
END.
    FOR each Mailpiece Builder Task
        Study mailpiece attributes received from mailpiece
            coordinator or another mailpiece builder task;
        Determine profiles required by the motion control
            processor;
        Issue profile commands to the motion control processor
on
            receipt of attributes;
        IF Profile_Handoff_Done received, then
            Transmit READY signal;
            CASE Accumulator: send READY to document
                printer, and pre-print feeder
            CASE Dry Station: send READY to envelope
                printer;
            Case Flapper: send READY to dry station;
            Case Folder: send READY to accumulator and
reply
                envelope feeder;
            CASE Inserter: send READY to Folder and
Flapper;
            CASE Moistener: send READY to Inserter;
            CASE Sealer: send READY to Moistener;
            CASE Stacker: send READY to Sealer;
        END IF.
        IF Profile handoff started and all attributes present
            IF (Document printer, Pre-print feeder, Reply
            envelope feeder, Envelope printer, Dry station,
            Flapper, Folder, Moistener, or Sealer)
                Transfer attributes to the next logical task;
                ELSE IF Accumulator
                    Merge attributes from Document
printer,
                        Pre-print feeder, and Reply
                        envelope feeder;
                    Transfer attributes to the next logical
                        task;
                ELSE IF Inserter
                    Merge attributes from Folder and
                        Flapper;
                    Transfer attributes to the next logical
                        task;
                ELSE IF Stacker
                        Send PIECE COMPLETE message to
                        mailpiece coordinator;
                END IF.
            END IF.
        END.
```

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application thereby enabling others skilled in the art to understand the invention for various embodiments and with various modifications as are suited to the particular use contemplated. It is intended that the scope of the invention be defined by the accompanying claims and their equivalents.

What is claimed is:

1. A method for generating a mailpiece in a mailing system having a plurality of document paths, the method comprising the steps of:

generating a table for tracking each mailpiece in the mailing system, requiring no printing of codes on each mailpiece;

storing attribute data relating to the mailpiece in a memory;

storing job data relating to a mailing job in the memory;

determining a set of actions to be performed on the mailpiece in correspondence to the attribute data; and, providing at least one mailpiece builder task for commanding the set of actions.

2. The method of claim 1 further comprising the step of providing an indication of occurrence of the mailing system initializing a job run.

3. The method of claim 2 further comprising the step of providing an indication of occurrence of the mailing system generating a first mailpiece.

4. The method of claim 1 further comprising the step of providing a motion control task for executing the set of actions.

5. The method of claim 4 further comprising the step of communicating a result of the set of actions to the mailpiece builder task.

6. A method for generating a mailpiece in a mailing system having a plurality of document paths, the method comprising the steps of:

generating a table for tracking each mailpiece in the mailing system;

storing attribute data relating to the mailpiece in a memory;

storing job data relating to a mailing job in the memory;

determining a set of actions to be performed on the mailpiece in correspondence to the attribute data;

providing a plurality of simultaneously executing mailpiece builder tasks for commanding the set of actions;

providing a motion control processor for executing the set of actions; and providing a coordinator task for monitoring the generation of the mailpiece.

7. The method of claim 6 further comprising the step of providing an indication of occurrence of the mailing system initializing a job run.

8. The method of claim 7 further comprising the step of providing an indication of occurrence of the mailing system generating a first mailpiece.

9. The method of claim 6 further comprising the step of transmitting attribute data from the memory to each of the plurality of mailpiece builder tasks.

10. The method of claim 6 wherein each of the plurality of mailpiece builder tasks has a preceding logical mailpiece builder task and a subsequent logical mailpiece builder task.

11. The method of claim 10 further comprising the step of transmitting a first status signal from each of the plurality of mailpiece builder tasks to a corresponding subsequent logical mailpiece builder task.

12. The method of claim 11 further comprising the step of transmitting a second status signal from each of the plurality of mailpiece builder tasks to a corresponding preceding logical mailpiece builder task.

13. The method of claim 10 further comprising the step of transferring attribute data from each of the plurality of mailpiece builder tasks to a corresponding subsequent logical mailpiece builder task.

14. The method of claim 13 wherein at least one of the mailpiece builder tasks has a plurality of preceding logical mailpiece builder tasks and a subsequent logical mailpiece builder task.

15. The method of claim 14 further comprising the step of merging the attribute data from the plurality of preceding logical mailpiece builder tasks.

16. In an apparatus for generating a mailpiece in a mailing system having a plurality of document paths, a host computer for generating a table for tracking each mailpiece and executing a plurality of tasks, the tasks including a mailpiece coordinator task for monitoring the generation of the mailpiece and a plurality of simultaneously executing mailpiece builder tasks for determining the motion control requirements for the mailpiece.

17. An apparatus as described in claim 16 wherein each of the plurality of mailpiece builder tasks corresponds to a mechanical module in the mailing system.

18. An apparatus as described in claim 17 wherein each of the plurality of mailpiece builder tasks selects a set of profiles for controlling each mechanical module.

19. An apparatus as described in claim 18 wherein the set of profiles correspond to attribute data defining the mailpiece.

20. An apparatus as described in claim 16 wherein each of the plurality of mailpiece builder tasks provides a flag setting means for setting at least one flag in the set of profiles.

* * * * *